United States Patent [19]

Sherwood

[11] Patent Number: 4,615,511
[45] Date of Patent: Oct. 7, 1986

[54] CONTINUOUS STEELMAKING AND CASTING

[76] Inventor: William L. Sherwood, 553 Granville Street, 5th Floor, Vancouver, B.C., Canada, V6C 1Y6

[21] Appl. No.: 610,885

[22] Filed: May 16, 1984

Related U.S. Application Data

[62] Division of Ser. No. 351,669, Feb. 24, 1982, Pat. No. 4,456,476.

[51] Int. Cl.[4] ............................................. C22B 7/00
[52] U.S. Cl. ................................. 266/208; 266/236; 266/238; 266/239; 75/46; 75/49
[58] Field of Search ............... 266/208, 239, 236, 238; 75/49, 46

[56] References Cited

U.S. PATENT DOCUMENTS

| | | | |
|---|---|---|---|
| 3,692,443 | 9/1972 | Lightner | 266/208 |
| 4,105,438 | 8/1978 | Sherwood | 75/46 |

*Primary Examiner*—Peter D. Rosenberg

[57] ABSTRACT

In a continuous steelmaking method, a molten metal bath is maintained within a rotary furnace heated by oxy-fuel burners at the charge and discharge ends. Metallic iron charge material such as iron and steel scrap or sponge iron is preheated primarily by heat transferred from the furnace exhaust gases, on an enclosed recuperative conveyor before being introduced through the charge end opening. Molten metal is withdrawn through a siphon tube submerged in the bath through the furnace discharge end opening into a vacuum chamber which is part of an integral vacuum chamber-tundish combination incorporating a molten metal column under vacuum in one leg and a molten steel tundish casting pool under atmospheric pressure as the other leg, connected via a submerged channel. As steel is cast out of the tundish through a submerged nozzle, it is replenished by way of the column from vacuum-induced flow through the siphon tube, metal surface levels in column and tundish remaining substantially constant once casting has been established. Several means are provided for regulating withdrawal and casting rate, including the use of slide-gate valves and varying the vacuum pressure, and also a procedure for initiating the method without pre-filling the vacuum chamber-tundish with starting molten metal. Optional features include oxygen injection into the vacuum chamber, argon stirring for degassing and alloy additions through a sealed conduit or by injection. According to the invention, continuous flow of material may be realized from charging and preheating of the charge through to continuous introduction of the steel into the casting molds, with only a very small vertical descent between charging and pouring. Other salient advantages include very high overall energy efficiency, low capital costs, negligible furnace to mold temperature losses, efficient steel degassing, high alloy recoveries, flexible steel chemistry control, wide range of acceptable charge materials, and clean pollution-free operation.

14 Claims, 4 Drawing Figures

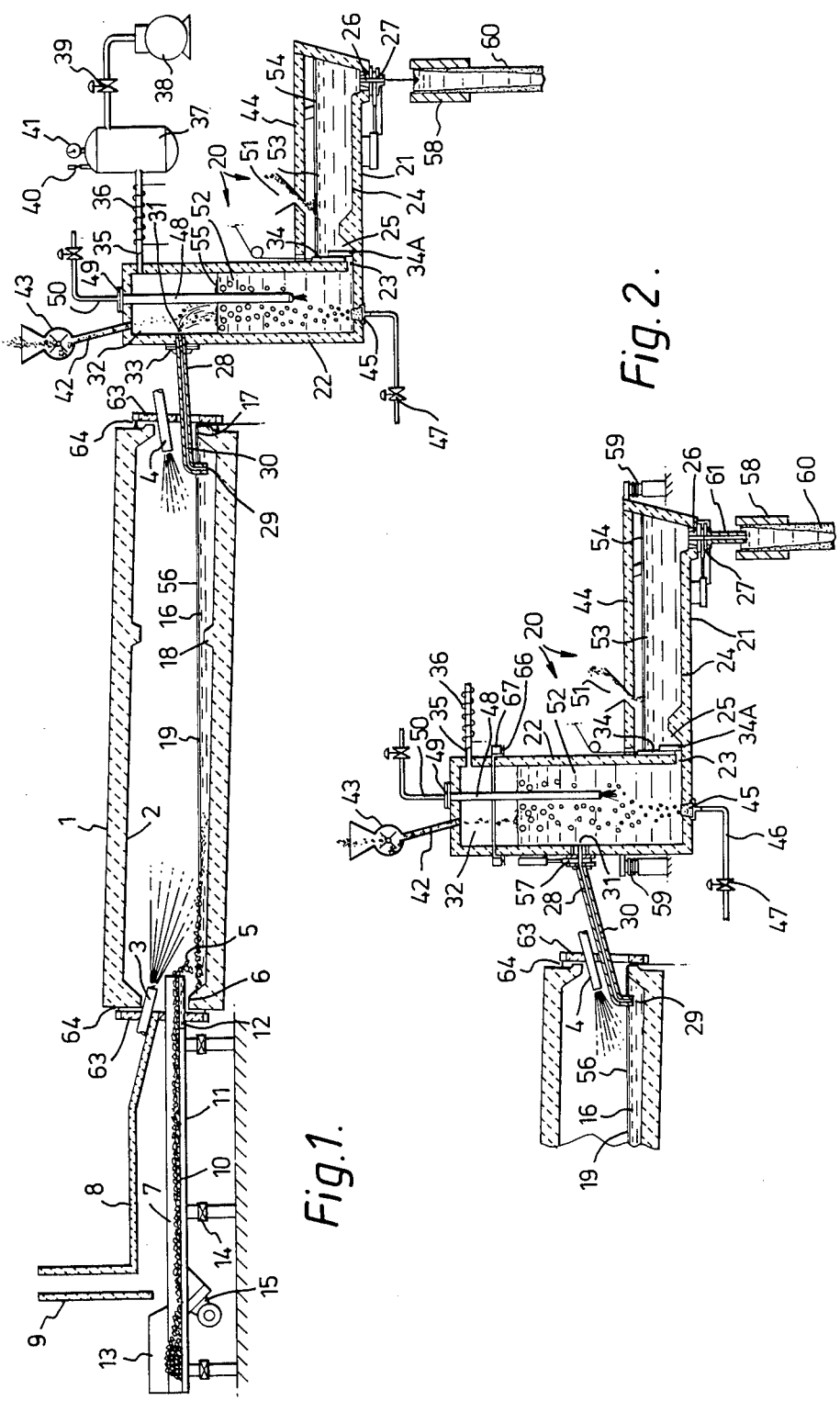

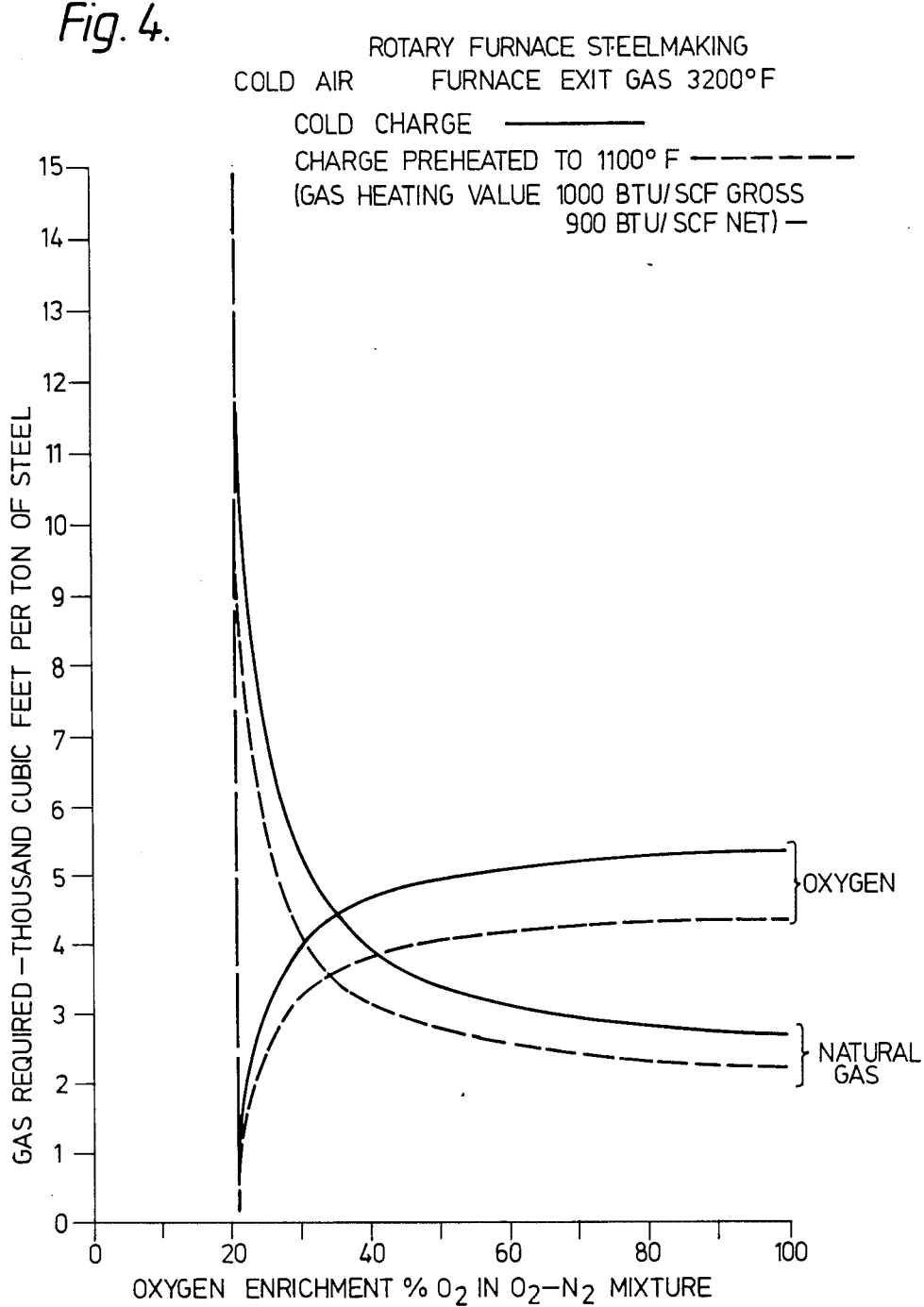

CONTINUOUS STEELMAKING AND CASTING

This application is a division of my co-pending application Ser. No. 351,669 filed Feb. 24, 1982, U.S. Pat. No. 4,456,476.

The invention relates to continuous processing of molten metals and alloys and, more particularly, to improved methods and apparatus for continuous steelmaking and casting.

My U.S. Pat. No. 3,514,280 describes a continuous steelmaking method conducted in a rotary furnace and my U.S. Pat. No. 4,105,438 describes continuous metal melting, withdrawal and discharge from rotary furnaces employing a siphon tube leading into an external withdrawal chamber maintained under a negative pressure controlled in such a manner as to regulate the rate of metal discharge via the chamber. These are provided for steelmaking from a metallic iron charge as an alternative to electric-arc furnace and electric-induction furnace steelmaking conducted on a batch basis, which are the predominant prior art technologies.

The present invention introduces new elements and combinations including continuous steel vacuum degassing and treatment techniques between the furnace and casting mold in a new molten metal withdrawal and transfer configuration, and charge preheating using exhaust gas heat. When combined with preferred furnace firing techniques, a surprisingly high overall energy efficiency results. Various advantages and objects of the invention may be reviewed as follows:

(a) to decrease the number of external withdrawal vessels involved in discharging of molten steel from the furnace and preparation for casting as well as decrease the number of gravity transfers of molten steel, thereby reducing the overall steel temperature loss in passing from furnace to mold and also minimizing the opportunity for surface oxidation of the steel;

(b) to minimize the total vertical drop of metal between furnace and casting, and also between furnace charging and casting, thereby achieving a very low overall height of the steel production equipment, making possible low building, support structure and headroom profiles, reducing lifting, stairway and climbing requirements, with an overall result of surprisingly low capital cost and ease of operation;

(c) to provide means for starting up the continuous withdrawal procedure under controlled vacuum without pre-filling the bottom of the withdrawal vessel or tundish in place with molten steel before starting withdrawal. As an adjunct to this, all of the metal from start of casting is withdrawn from the same source and therefore is at nearly the same temperature and composition, maximizing the steel usable as cast product;

(d) to simplify set-up, maintenance and replacement of molten metal withdrawal equipment in place;

(e) to provide for effective continuous degassing of the molten steel during passage from furnace to mold and without ladle vacuum treatment of the steel, thereby decreasing the content of dissolved gases in the steel prior to casting it to reduce the nonmetallic inclusions in the steel and incidence of casting defects from gases coming out of solution during solidification, yielding improved metallurgical quality of the cast product;

(f) to provide for the introduction of alloys and other additives on a continuous basis during passage of steel from furnace to mold in a manner yielding high recoveries of alloys and minimal losses;

(g) to provide easy and flexible adjustment of steel carbon content either up or down during passage of steel from furnace to mold;

(h) to substantially reduce process energy losses and to realize exceptional overall energy efficiency relative to prior known methods and apparatus for the production of steel;

(i) to achieve lower furnace steel temperatures at equivalent casting temperatures, thereby improving energy efficiency and reducing the severity of high temperature attack of molten steel against the refractories in furnace and withdrawal apparatus vessels;

(j) to allow a wide range of metallic iron charge materials to be applied, including low cost scrap such as machine shop borings and turnings contaminated with oil and moisture;

(k) to substantially reduce the quantity of pollutants emitted from the operation and requiring subsequent treatment for maintaining a clean environment.

One aspect of the method of the invention for charging, melting and discharging the molten metal from the rotary furnace comprises the following series of steps:

(a) maintaining a molten metal bath within a rotary furnace having an axial charge end opening and an axial discharge end opening with the bath surface exposed to substantially atmospheric pressure;

(b) maintaining an enclosed molten metal column external to said furnace having the top surface exposed to a controlled vacuum pressure and confined within an enclosed vacuum chamber having an enclosed duct within a siphon tube having the inlet end inserted through said axial furnace discharge opening down through the bath surface and submerged in said bath and the outlet exiting into said enclosed chamber;

(c) withdrawing molten metal from said bath into said column under the influence of said vacuum pressure via said enclosed duct;

(d) allowing flow of metal from within said column out through a submerged opening under the influence of gravity at an average rate corresponding to the rate of withdrawing molten metal from said bath;

(e) conveying metallic iron charge material along a conveyor covered by an enclosure in direct communication with the interior of said furnace;

(f) introducing heat by combustion from an oxygen-fuel burner directed through said charge end opening for melting said metallic iron charge;

(g) introducing heat by combustion from an oxygen-fuel burner directed through said discharge end opening for maintaining said metal bath in a molten condition at controlled temperature;

(h) effecting flow of combustion products within said furnace countercurrent to the general charge movement from said discharge end to said charge end and then into said enclosure to pass in contact with said charge on the conveyor in a manner to effect preheating of said charge material on the conveyor and prior to entry of the charge into said rotary furnace;

(i) discharging said charge material from said conveyor into said furnace through said charge end opening at an average rate corresponding to the average rate of said withdrawing molten metal from said molten metal bath.

Another aspect of the invention for a method of continuous steelmaking, continuous degassing and casting comprises the following steps:

(a) maintaining a molten metal bath within a rotary furnace having an axial charge end opening and an axial discharge end opening with the bath surface exposed to substantially atmospheric pressure;

(b) maintaining an enclosed molten metal column external to the furnace having the top surface exposed to a controlled vacuum pressure and confined within an enclosed vacuum chamber having an enclosed duct within a siphon tube having the inlet end inserted through the axial furnace discharge opening down through the bath surface and submerged in said bath and the outlet exiting into said enclosed chamber;

(c) maintaining a molten steel casting pool connecting with said column via at least one submerged channel, with the top surface at a level higher than the column bottom level extremity and subjected to a substantially constant reference gas pressure; for example, atmospheric pressure;

(d) allowing flow of metal from within said column into said casting pool by way of said submerged channel connecting between them;

(e) allowing pouring of molten steel for casting through at least one submerged nozzle opening from said casting pool; and (f) withdrawing molten metal from said bath into said column under the influence of said vacuum pressure via said enclosed duct at a rate providing for continual replenishment of the steel pouring from said casting pool for casting.

By employing pure or nearly pure oxygen in the burners as the heat source, rather than air or oxygen-enriched air at low levels of enrichment, surprising overall heat economy is realized. Preheat temperatures in the range of 900° F.–1400° F. for the metallic iron charge material are most practical in this regard, which yield an energy consumption in the area of 3 million btu per ton of molten metal withdrawn, including the equivalent hydrocarbons consumed in thermal generation of the power to make the requisite oxygen.

Optional features of the method include:

(a) varying and controlling the metal withdrawal rate by regulating the vacuum pressure in the vacuum chamber;

(b) controlling the metal withdrawal rate by throttling of the stream flowing through the enclosed duct;

(c) controlling the rate of flow of the pouring stream for casting by throttling the stream passing through the pouring nozzle;

(d) adding alloys directly into the metal within the vacuum chamber;

(e) injecting oxygen or entrained additives into the metal within the vacuum chamber via a submerged injection tube, or submerged tuyeres;

(f) bubbling an inert gas such as argon or helium up through the column of metal confined within the enclosed vacuum chamber to accomplish additional degassing and stirring of the metal;

(g) controlling the rate of metal flow from the enclosed column into the pouring pool by throttling of the transverse cross sectional area of the submerged channel between the column and the pouring pool; and (h) maintaining or increasing temperature within the vacuum chamber by means of electrical energy introduced via electrodes inserted into the chamber via sealed connections to make electrical contact with the molten metal column.

The preferred method of initiating continuous metal withdrawal and steelmaking includes the following combination of steps:

(a) inserting one end of a refractory siphon tube into the rotary furnace discharge end opening and beneath the surface of the molten metal contained inside;

(b) connecting the other end of the siphon tube into an enclosed vacuum chamber of a metal withdrawal and pouring tundish adjacent to the furnace, the vacuum chamber having a bottom outlet opening within the tundish proximate the bottom of the tundish;

(c) providing a temporary barrier to block the bottom outlet opening;

(d) applying a controlled vacuum pressure to the chamber drawing metal from within the furnace through the internal duct in the tube into the vacuum chamber, allowing the chamber to fill until the liquid metal pressure near the bottom at the level of the opening increases to the extent that it approaches the pressure external to the chamber;

(e) removing the temporary barrier from the opening and allowing metal within the chamber to flow through the opening into the internal portion of the tundish external to the chamber;

(f) submerging the exterior side of the opening under the surface of the metal pool forming within the tundish prior to exit of all of the metal from within the chamber occurring through the opening;

(g) allowing the depth of the metal pool to increase to form a casting pool above at least one nozzle opening in the tundish; and then (h) continuously maintaining this casting pool during pouring through the nozzle opening for casting by continual replenishment of the poured metal with metal supplied through the siphon tube and vacuum chamber, while pouring over protracted periods of casting.

In the above procedure it is preferable that the bottom outlet opening of the vacuum chamber is located within a depressed well of limited area within the tundish bottom whereby the initial tundish metal pool is laterally confined and limited to a restricted volume of metal which quickly covers the outlet opening after removing the temporary barrier, thereby preventing any opportunity for emptying out of the chamber during initial filling of the tundish.

The invention also provides a suitable apparatus for conducting the method comprising the following assembly:

(a) an elongated, heated rotary furnace adapted for containing a bath of molten steel with axial charge and discharge end openings;

(b) charging means adapted for introducing metallic iron charge material into the furnace through the charge end opening;

(c) a continuous casting tundish having at least one submerged nozzle opening adapted for pouring by gravity from the tundish;

(d) an enclosed vacuum chamber incorporated into the feed section of the tundish comprising a refractory enclosure with a bottom section having bottom discharge opening into the tundish proximate the tundish bottom and an enclosed top section projecting upwards above the tundish;

(e) a controlled pressure vacuum line connecting into the vacuum chamber adapted for maintaining a controlled vacuum pressure within the chamber and also withdrawing any gases evolved from molten metals within or introduced by way of any air leakage or other introduction from an external source during withdrawal;

(f) a metal withdrawal siphon tube of refractory material with the inlet end adapted for insertion through the discharge end opening down into the molten metal and the outlet end adapted for connection into the upper part of said vacuum chamber, the siphon tube having an internal duct adapted for transferring molten metal from the furnace into the vacuum chamber under the influence of the controlled vacuum pressure;

(g) closing and opening means for the vacuum chamber bottom discharge opening adapted to be closed and block free passage of tundish air at the time of applying initial suction pressure to start metal flowing into the withdrawal chamber when it is effectively empty and to be opened to permit flow when sufficient metal has been withdrawn and accumulated to assure a sufficient metal pool, considering both tundish and withdrawal chamber together, to maintain the opening thereafter submerged.

A preferred embodiment of the apparatus includes an interior well in the bottom of the tundish with the sides of the well surrounding the opening and the top of the well at least as high as the top of the opening and the well cross section area in the horizontal plane less than the enclosed vacuum chamber cross section area. The well is thereby adapted to limit the quantity of molten metal which can flow through the opening before the outside of the opening becomes submerged by the metal pool confined in the well and prevent passage of tundish gases through the opening into the enclosed vacuum chamber at any time after removing a temporary barrier across the opening to allow metal to flow from the chamber into the tundish interior.

The preferred overall apparatus includes oxy-fuel burners at both charge and discharge ends of the rotary furnace; a conveyor within an enclosure adapted for conveying a metallic iron charge up to the furnace and introducing it through the charge end opening; and exhausting means for furnace gases through the charge opening and within the conveyor enclosure in contact with the charge and countercurrent to the charge movement thereby adapted to preheat the charge.

Optional features include means for opening and closing the bottom casting nozzle opening; throttling means for regulating the size of the bottom casting nozzle opening adapted to adjust the rate of casting molten steel from the tundish; and a detachable siphon tube with means for quick connection and disconnection adapted to facilitate prior insertion, preheating and placement of the siphon inlet end in the furnace, followed by placement of the tundish assembly in operating position and its connection to the siphon tube outlet end.

Additional optional features include a slide-gate valve adapted for shut-off and throttling of the internal duct of the siphon tube; a porous refractory plug at the bottom of the vacuum chamber adapted for inert gas stirring and degassing of molten metal within the chamber; a sealed feed pipe adapted for introduction of alloys into the enclosed vacuum chamber; an injection pipe adapted for introduction of oxygen or additives entrained in a carrier-gas down into the molten metal within the enclosed vacuum chamber, mounted with a sealed connection onto and through the walls of the chamber; and heating electrodes adapted for maintaining column temperature also inserted via a sealed connection and providing for adjustment of the depth of insertion into the chamber particularly to compensate for electrode consumption in use.

Various other objects, features and advantages of the method and apparatus of this invention will become apparent from the following detailed description and claims, and by referring to the accompanying drawings.

FIG. 1 is an elevation view, diagrammatic and partly in section, of a continuous steelmaking furnace assembly in operation;

FIG. 2 is a similar partial view illustrating an alternative method and apparatus arrangement;

FIG. 4 is a graph presenting principal results of a process energy balance according to a typical application of the invention.

Figure 3:
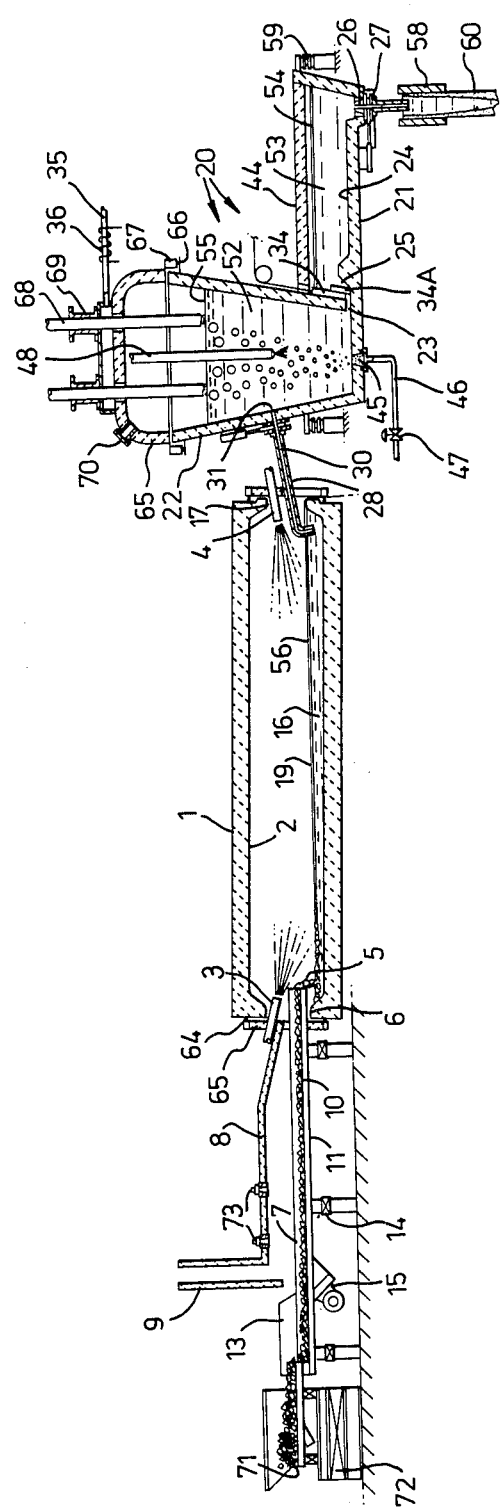
FIG. 3 is another alternative method and apparatus arrangement.

The rotary furnace shown in FIG. 1 comprises a body consisting of a cylindrical steel shell 1, lined with refractory material 2, and is rotated on trunnions mounted on an appropriate foundation (not shown). The furnace is fired by a charge end burner 3 supplying heat for melting, and a discharge end burner 4 supplying additional heat and regulating the temperature prior to discharge. Suitable fuels include natural gas, fuel oil or powdered coal, reacting with preheated air or oxygen-enriched air; or the preferred embodiment, pure oxy-fuel firing. Various designs of oxy-fuel burners are known and available for this purpose. For example, the water-cooled Linde AB-3 oxygen burner has a capacity of 30 million btu per hour with an overall diameter of only 3½ inches, and is adaptable to either gas or oil as fuel. The AB-4 burner has an 80 million btu capacity with 4½ inches outside diameter. Designs are also available for firing of powdered coal.

The metallic iron furnace charge 5, is fed in through annular charge opening 6 by oscillating charge conveyor 7 and enters directly into a partially molten metal bath 16 in the embodiment illustrated. The hot waste gases leaving the furnace are confined within a refractory enclosure 8 so that the gases pass over and preheat the charge, also evaporating and combusting oil, moisture and other contaminants on the scrap, exiting via an appropriate exhaust stack 9, which may be equipped with a furnace pressure control damper, heat exchanger, dust collectors or the like, as required. Owing to the high temperatures, the conveyor includes two decks, namely, a top wear and heat-resistant deck 10 and a supporting deck 11. The conveyor is mounted on springs 14 for oscillation by vibrator assembly 15. In order to maintain a controlled feed rate, the feed end hopper section 13 is fed with metallic iron charge material by a weigh feeder 71 mounted on weighing scale 72.

The metal bath 16 extends along the length of the furnace and is normally covered by a layer of slag 19 which can be allowed to overflow through the annular discharge opening 17. The annular dam 18 restricts the transfer of metal between the melting zone near the charge end and the refining zone near the discharge end and therefore assists in stablizing the metal composition within the refining zone in preparation for discharge. The furnace end openings may be obstructed against losses of gases and heat by refractory-lined charge and discharge covers 63, which also may incorporate annular air curtains 64 or other sealing means common in the art of rotary furnaces.

The combination tundish-withdrawal vessel 20, as illustrated, comprises the continuous casting tundish vessel 21 with integral enclosed vacuum chamber 22 mounted at the inlet end incorporating bottom discharge opening 23 proximate the tundish bottom 24. In the illustrated embodiment, the opening 23 discharges into a restricted well 25 recessed into the tundish bottom and surrounding the opening 23. The tundish is equipped with at least one steel pouring nozzle 26 which can be equipped with a slide-gate 27, or alternatively a stopper rod, or other devices according to known practice for opening and closing or adjusting the flow rate from tundishes during casting. The vacuum chamber 22 most conveniently has a removable cover 57 to facilitate access and refractory repair, which is sealed, for example, by a water-cooled ring carrying a circular seal 67 resting on sealing flange 66 around the chamber circumference. A sight port 70 may also be provided for observing the conditions inside, particularly the positions of lance or electrodes, etc.

The siphon tube 28 made of refractory material is shown in the operating position with the inlet end 29 inserted through the discharge end of the furnace and down into the molten metal 16 contained therein, and the outlet end 31 connected into the top area 32 of vacuum chamber 22 employing a flanged connector arrangement 33 which preferably includes quick-release fasteners. The temporary gate barrier 34, guided on either side of the opening by refractory guide bars 34A, which can also be supplemented with temporary mortar or granular material, provides means to temporarily block opening 23 at the start of metal withdrawal until sufficient depth of metal has been accumulated in vacuum chamber 22 to increase the fluid pressure at submerged opening 23 up to a level close to the outside atmospheric pressure. The siphon tube 28 as illustrated in FIG. 1 can also take the form of an inverted U-tube with the outlet directed downwards through the top of vacuum chamber 22, although metal containing substantial quantities of dissolved gases may lead to problems, particularly at lower levels of vacuum pressure. The metal carrying duct within the siphon tube may vary in cross section. The narrowest section, which may be referred to as the metering hole 30, mainly controls the flow rate. The embodiment illustrated includes a diverging taper towards the duct outlet end adapted to somewhat reduce the discharge velocity into the vacuum chamber. In FIGS. 2 and 3, the outlet end 31 of siphon tube 28 discharges beneath the surface of metal column 52. This has the advantage of reducing splashing and direct impingement contact of the metal stream with the inside chamber walls, somewhat offset by loss of direct droplet degassing upon discharge into the vacuum chamber. A slide-gate valve 57 across the siphon outlet also provides for convenient closing of this opening during initial chamber evacuation and can also be adapted for throttling control of flow.

The negative suction pressure, as required for metal withdrawal, is applied by a vacuum pump and evacuation system. The vacuum manifold 35 is traced with a water cooling coil 36 and connects the top area 32 of the enclosed chamber 29 to a receiver tank 37 (condenser) which settles out dust and dirt as well as the greater part of the moisture in the gases removed from the metal. This tank is evacuated by the vacuum pump 38 via a valved manifold. The pressure in the system is regulated at a controlled setting by the vacuum controller 39 connected into the receiver tank, which is also equipped with an air bleed valve 40 and pressure gauge 41. This vacuum control system is shown by way of example but can take various other known forms such as single-stage or multiple-stage ejectors, the latter being particularly effective at very high levels of vacuum.

The vacuum chamber illustrated also includes a sealed conduit 42 for introducing alloys into the metal during the withdrawal and degassing stage. Feeding of alloys is accomplished through a sealed rotary gate valve 43 although various arrangements such as two-chamber vacuum locks and the like can also be employed to limit the inflow of gas through the conduit pipe and thereby facilitate the close control of vacuum pressure in the vacuum chamber. The amount of slag which can be accumulated on metal surface 55 in the vacuum chamber is obviously limited, but at high vacuum levels whereby oxygen is substantially excluded, substantial quantities of oxidizable alloys such as ferromanganese, silicomanganese and ferrosilicon can be added without problems, with very high recoveries of allowing elements. The tundish 21 includes a cover 44 to limit heat loss and can also be equipped with a conduit or chute 51 for the introduction of alloys, slag constituents or the like. Further, a burner can be mounted in the tundish roof to furnish additional process heat just prior to casting.

Metal stirring, removal of dissolved gases and other vacuum chamber reactions may be assisted by bubbling an inert gas up through the molten metal column 52. Porous refractory plug 45 supplied with argon, helium or other such gas through pipe 46 at regulated flow, such as by valve 47, illustrates this practice. Similarly, submerged oxygen injection under vacuum and injection of powdered additives such as calcium silicon and other alloys entrained in argon or other inert gas, for desulphurization, alloying and the like, are well known in the art of vacuum metallurgy. Ore or more lancing pipes 48 are provided for this function attached to vacuum chamber 22 by sealed flanged connection 49 and supplied with gas and entrained additives via supply pipe 50. These lancing pipes are consumable, refractory covered, water-cooled metal, or a combination of water-cooling and refractory protection according to known injection technology. For any given average steel production rate, much lower average flow rates for argon, oxygen and additives are a principal advantage of the invention over batch techniques.

The general mode of operation first generally involves heating of the inner furnace walls to more than 3000° F. using both burners before beginning charging from weighfeeder 71 via charge conveyor 7. A wide range of metallic iron charge materials may be used including cast iron scrap, steel scrap, pig iron, or remelting stock such as sponge iron, ingots, and the like. Although the maximum dimensions of the scrap are limited by the conveyor size and charge opening 6 dimensions, low-grade scrap such as borings and turnings containing substantial amounts of oil and moisture can be used, since these contaminants are evaporated and combusted within the preheating enclosure 8. If such combustion is incomplete, completion can be assisted by afterburners 73. Slag-forming constituents to control slag composition can also be added in controlled quantities as required. After such time as a sufficient molten metal bath 6 has been accumulated and its temperature adjusted by controlling the fuel input to discharge end burner 4, the siphon tube 28 is then conveniently inserted into the furnace above the bath for an initial preheating period for the tube inlet end 29. When the tube is hot enough not to freeze the metal upon insertion into the bath, the tundish vessel 20 is moved into casting position, and the siphon tube discharge end 31 attached into it, at the same time inserting the inlet end 29 down into the metal bath. With the opening 23 closed or blocked, negative suction pressure is then applied to vacuum chamber 22, causing the metal to flow from the furnace into the chamber. The metal progressively begins to fill the bottom area of the chamber and build up metal column 52. When the metal depth head becomes about equal to the vacuum pressure head, the barrier is removed, allowing the metal to flow through opening 23 to first fill well area 25 and submerge opening 23 from the outside, and then build up within tundish casting pool 53. When casting depth is reached, tundish nozzle slide gate 27 is opened, allowing steel to begin flowing through nozzle opening 26 for casting. The metal in tundish 21 establishes a level of surface 54 according to the size and flow resistance of nozzle 26. Casting then can take place on a continuous basis over prolonged casting periods after reaching approximate steady state levels of metal pools 54, 55 and 56. Load cells 59 can be incorporated into the supports for tundish withdrawal vessel 20 as a guide for timing of the opening of temporary barrier 34 and also for monitoring the depth of tundish casting pool 53.

Several methods for horizontal continuous casting involving casting directly at the outlet from the tundish nozzle are also known and applicable in combination with the invention, a principal difference being that the nozzle opening 26 is directed horizontally rather than vertically. A surprising and beneficial result thereby achieved is an elevation difference of only 2 to 3 feet between furnace metal surface and the continuously discharging horizontal cast bar.

The difference in height between the level of tundish metal surface 54 and column metal surface 55 is governed by Bernoulli's theorem, and is equal to the difference between the external atmospheric pressure head on tundish metal surface 54 and the vacuum pressure in chamber 32 acting on surface 55, plus any flow pressure drop through opening 23. At nearly complete vacuum levels inside, this difference is in the area of $4\frac{1}{4}$ feet for liquid iron and steel, the effective maximum. Ranges of vacuum up to complete evacuation are therefore possible by a chamber configuration providing, in the case of iron and steel, for a metal column height of $4\frac{1}{4}$ feet plus adequate non-filled chamber space of top area 32 above the metal. At least 6 inches in height but preferably 1 to 3 feet of non-filled space is desirable, resulting in a total internal chamber height generally in the range of 5 to 7 feet above the level of tundish metal surface 54. A range of preferred tundish metal heights are well established in the art of continuous casting. The method and apparatus obviously can operate with substantially lower vacuum levels and vessel height than those indicated, but such a configuration provides full degassing flexibility up to the level of essentially complete evacuation, which in practice may be about 750 microns (0.75 Torr or 1/1000 atmosphere). It is also well known that steel degassing efficiency is much greater at such low levels than at, say, 5 Torr, although the latter also represents a very low pressure relative to atmospheric pressure.

FIG. 2 illustrates the tundish located at a higher level than FIG. 1, and again according to Bernoulli's theorem, the level of tundish metal surface 54 can be raised up very close to the level of the furnace bath surface 56, with the minimum difference only the flow friction, entry and exit head losses through siphon tube 28 and submerged channel 23. This does not directly effect the metal height criteria as outlined above and can be very beneficial in reducing headroom requirements and lowering capital costs of the installation.

It is evident that furnace discharge rate depends directly on the size of metering hole 30, height of siphon tube outlet 31 above furnace bath surface 56, and magnitude of vacuum pressure. During the course of continuous casting of molten steel, progressive erosion of metering hole 30 may be expected. In order to maintain a constant rate of flow for casting, either the vacuum must be reduced or the flow restricted, such as by a throttling with gate valve 57. Tundish valve 27 can also be employed for throttling to assist in controlling the casting rate, but does not directly influence the average rate of withdrawal from the furnace. Further, it will be evident that the pressure differential between the bottom of metal column 52 and that of pool 53 may be much lower than the pressure drop through metering hole 30, thus the cross section of opening 23 should usually be substantially larger than that of siphon tube metering hole 30. As the metal is introduced into continuous casting mold 58, the stream may be protected by ceramic shroud 61. Thus, when a slag layer is present on the tundish pool surface, at no time does the molten metal come into direct contact with the outside atmosphere in the entire withdrawal and casting sequence, thereby minimizing any opportunity for surface oxidation.

In another embodiment (not illustrated), the submerged channel can be an enclosed duct incorporating a slide-gate valve with throttling capability. In this case, it is convenient to reverse the flow control point for metering flow rate into the tundish, from the siphon tube to the submerged channel, providing a siphon tube enclosed duct cross section normally larger than the submerged channel opening. By submerging the siphon outlet end below the metal column surface, as shown in FIG. 2, a constant vacuum pressure then maintains a substantially constant head of molten metal above both surface 56 and at the same time above the submerged channel opening 23 as used for metering to obtain a controlled level of tundish metal pool surface 54 above nozzle opening 26.

The average residence time of molten metal in the column 52 for reactions and degassing varies according to the column size and production rate. For example, for a steelmaking operation at 10 to 15 tons per hour, a metal column $3\times3$ feet in cross section and $5\frac{1}{2}$ feet deep would contain about 12 tons of metal, providing an average retention time on the order of one hour. Residence time for a 25 ton-per-hour steelmaking operation, likewise, would be about $\frac{1}{2}$ hour through the same vacuum chamber.

It is well known that the electric-arc furnace, when operated on a single slag steel production basis, consumes approximately 500 kilowatt-hours (kwh) per short ton of steel melted. This is equivalent to 1.7 million british thermal units (btu) per ton energy consumed. According to a 1975 Battelle, Columbus Laboratories, report to the U.S. Bureau of Mines on Energy Use Patterns in Metallurgical and Non Metallic Mineral Processing, there are approximately 3.07 btu of hydrocarbon fuel required to generate 1 btu of electrical energy, indicating a gross electric-arc furnace consumption of 3.07 (1.7)=5.22 million btu per net ton of steel on the average.

FIG. 4 presents results of energy balances for the method and apparatus of the invention illustrating the surprising effect on energy consumption of firing with pure oxygen. The graphs are based on natural gas with a gross heating value of 1000 btu per cubic foot and net heating value of 900 btu. It thus may be seen that the gross fuel consumption amounts to approximately 2.64 million btu per net ton when steelmaking from cold scrap also requiring approximately 5280 cubic feet of oxygen. Referring to the same Battelle study, oxygen generation requires approximately 183,000 btu heat equivalent per thousand cubic feet, indicating a heat requirement of 5.28 (183,000)=966,000 btu per ton of steel. The total heat usage, then, amounts to only 2.64+0.97=3.61 million btu, more than a 30% total saving over electric-arc furnace steelmaking when using electricity generated from combustion of hydrocarbon fuel.

Because a major part of the melting heat is required near the charge end of the furnace, the exhaust gases leave the furnace at a temperature inherently in the area of 3000° F. By utilizing this heat for preheating of the charge on an enclosed conveyor, substantial further savings are realized, for example, 1100° F. preheat yields a net consumption of 2.95 million btu combined fuel and oxygen per net ton, a further 18 percent saving, and more than 40 percent saving over the electric-arc furnace. This also corresponds to more than a 20% production rate increase at the same furnace firing rate.

In addition, temperature and energy losses during tapping and ladle-to-tundish pouring are greatly reduced. Tapping losses are generally in the area of 80° F. and ladle-to-tundish transfer 20° to 40° F. The siphon tube and submerged passage according to the present invention reduce the overall magnitude of these losses from about 100° F. to less than 20° F., a five-fold improvement. Continuous flow relative to ladle batch casting is a further benefit. This saving also allows lower furnace temperature for equivalent casting temperatures, effecting refractory and maintenance savings.

Any reduction of temperature drop between furnace and mold allows lower furnace bath temperatures and is beneficial to the furnace operation, by decreasing heat consumption, allowing higher production rates and lower refractory consumption. Insulating refractories employed in the vacuum chamber and tundish walls help minimize such heat loss. Actual metal heating by means of electrical power supplied by way of graphite electrodes 68 slidably held within sealing collars 69 is another expedient known from vacuum ladle metallurgy. Another alternative is melting high carbon cast iron in the furnace bath and effecting decarburization to steel by oxygen injection into the metal column within the vacuum chamber, which is a strongly exothermic reaction. Oxidation of each 0.1 percent of carbon content increases metal temperature by approximately 25° F. These techniques can all be accommodated, singly or in combination, according to the method and apparatus of this invention.

Steel has been arbitrarily defined as an alloy of pure iron containing less than 2 percent carbon. Since decarburization can be effected by oxygen injection into the column, it is feasible and perhaps sometimes desirable to make molten cast iron with greater than 2% carbon content in the furnace bath, then decarburize within the column, to yield molten steel with less than 2% carbon in the tundish. In this description, the molten furnace charge and column metal are therefore referred to as "molten metal" rather than molten "steel", up to the stage of readiness for casting in the tundish pool.

Electric-arc melting and steelmaking ejects large quantities of dirt, dust and noise caused by the violent mechanical-thermal action of the arcs during the meltdown period, then by generation of iron oxides and other fumes under the influence of the intense arc during the refining period of a heat of steel, and finally during the violent cascade of tapping the steel into a ladle. By burning volatile contaminants in the preheat section and then almost immediately submerging the charge during melting, and by-passing the furnace tapping operation altogether, a several-fold cleaner exhaust gas and much cleaner overall operation is realized. Furthermore, oxy-fuel firing drastically reduces the nitrogen oxides in the waste gases, a very troublesome gaseous pollutant in many areas.

It will also be evident that the same general method and apparatus might be applied to making cast iron, or copper or aluminum, etc., but because of the difficulties peculiar to steel, including very high temperatures, high production rate requirements, high environmental pollution potential, high and troublesome dissolved gas and non-metallic inclusion content, and varied and strict product specifications required, the most surprising result resides in the facility and flexibility in overcoming the formidable combination of difficulties peculiar to steelmaking, in a flexible continuous operation mode at levels of energy and cost efficiency heretofore not obtained by prior art techniques.

Referring again to FIG. 4, it will be seen that the principal change in unit steel consumption of both oxygen and natural gas occurs at enrichment levels between 21 and 40 percent oxygen in the oxygen-air mixture. As enrichment is increased further from 40 to 100 percent, the percentage decrease in fuel consumption per ton of steel is much greater than the percentage increase of oxygen consumption. Under present energy cost conditions, which have changed greatly during the last decade, fuel has become relatively much more costly than oxygen, introducing a compelling reason to utilize pure or nearly pure oxygen for heating in this case. The most commonly advocated oxygen level is in the 25 to 35 percent range. It appears that this graph and its current significance in steelmaking economics have heretofore been unnoticed in the prior art for iron and steel production.

It will be appreciated that preferred embodiments of the method and apparatus for continuous steelmaking and casting have been described and illustrated and that variations and modifications may be made by persons skilled in the art, without departing from the scope of the invention defined in the appended claims.

I claim:

1. An apparatus for continuous melting, refining, degassing and casting of steel and other metals comprising, in combination:
   (a) an elongated heated rotary furnace adapted for containing a bath of molten metal with axial charge and discharge end openings;
   (b) charging means adapted for introducing metallic charge materials into the furnace through said charge end opening;
   (c) heating means adapted for continual heating and melting of the charge whereby it fuses into said bath of molten metal;
   (d) an enclosed vacuum chamber proximate the furnace discharge end adapted for enclosing a column of molten metal therein;

(e) a controlled pressure vacuum line connecting into said enclosed chamber adapted for maintaining a controlled vacuum pressure within said chamber and also withdrawing any gases evolved from molten metals within or introduced by way of any air leakage or other introduction from an external source during withdrawal;

(f) a metal withdrawal siphon tube of refractory material with the inlet end adapted for insertion through said discharge end opening down into said molten metal and the outlet end adapted for connection into said vacuum chamber, said siphon tube having an internal duct adapted for transferring molten metal from the furnace into said chamber under the influence of said controlled vacuum pressure;

(g) a continuous casting tundish having at least one submerged nozzle opening adapted for holding a casting pool of molten metal and for pouring it into a casting mold by gravity from said tundish;

(h) a submerged communication channel connecting between said withdrawal chamber and said tundish adapted for allowing flow of molten metal from said columnar pool of molten metal within said chamber into said casting pool contained in said tundish.

2. An apparatus according to claim 1 which also includes closing and opening means for said communication channel adapted to close and block free passage of tundish air into said enclosed vacuum chamber at the time of applying the initial vacuum pressure to start metal flowing into said enclosed chamber when it is effectively empty, and then to be opened to permit flow of molten metal into the tundish when sufficient metal has been withdrawn from the furnace and accumulated in said column to assure a sufficient quantity of molten metal, considering both tundish and withdrawal chamber together, to maintain said communication channel thereafter submerged.

3. An apparatus according to claim 2 which includes an interior well area in the bottom of said tundish with the sides of said well area surrounding said communication channel and the top of said well at least as high as the top of said channel and the well cross section area in the horizontal plane less than the enclosed vacuum chamber cross section area, said well thereby being adapted when opened to limit the quantity of molten metal which can flow through said channel to less than half the metal volume contained in the column at the time of opening, before the channel becomes totally submerged by the metal pool confined in said well and prevent passage of tundish gases into said enclosed chamber after establishing metal flow.

4. An apparatus according to claim 1 wherein said heating means comprises:

(a) An oxygen-fuel burner at the furnace discharge end adapted for introducing fuel and oxygen for combustion into the furnace through said discharge end opening;

(b) an oxygen-fuel burner at the furnace charge end adapted for introducing fuel and oxygen for combustion into the furnace through said charge end opening;

(c) an elongated conveyor within an enclosure extending along its length and connecting directly into the furnace charge opening adapted for conveying a metallic iron charge up to the furnace and introducing it through said charge end opening, and at the same time effecting flow of the gaseous combustion products emitted from said oxygen-fuel burners, counter current to the flow of charge material out through said charge opening and along said conveyor within said enclosure and in contact with said charge on said conveyor thereby preheating said charge prior to its introduction into said furnace.

5. An apparatus according to claim 1 which includes a shut-off valve for said siphon tube adapted for shut-off of said internal duct when required, such as during initial vacuum chamber evacuation.

6. An apparatus according to claim 1 which includes a throttling valve for said siphon tube adapted to adjust the rate of molten metal flow through said internal duct, at such time as the vacuum chamber is maintained under a high and substantially constant vacuum pressure.

7. An apparatus according to claim 1 which includes opening and closing means for said submerged nozzle opening.

8. An apparatus according to claim 1 which includes throttling means for regulating the size of said submerged nozzle opening adapted to adjust the rate of steel casting.

9. An apparatus according to claim 1 including means for quick connection and disconnection of said siphon tube from said enclosed chamber, adapted to facilitate prior insertion, preheating and placement of the siphon inlet end in the furnace, followed by placement of the tundish assembly in operating position and its connection to the siphon tube outlet end.

10. An apparatus according to claim 1 which includes an oxygen injection lance adapted for injecting oxygen under pressure into the molten metal column within said vacuum chamber, said oxygen injection lance being mounted with a substantially sealed connection onto and through the walls of said chamber.

11. An apparatus according to claim 1 which includes a porous refactory plug at the bottom of said enclosed vacuum chamber adapted for introducing an inert gas into said chamber from an external source for stirring and assisting wiht degassing of said molten metal column within the chamber.

12. An apparatus according to claim 1 which includes a sealed feed pipe adapted for introduction of alloys into said enclosed vacuum chamber while the chamber is maintained under a controlled vacuum pressure.

13. An apparatus according to claim 1 which includes an injection pipe adapted for introduction of additives entrained in a carrier gas down into the molten metal column within said enclosed vacuum chamber, said injection pipe being mounted with a substantially sealed connection onto and through the walls of said chamber.

14. An apparatus according to claim 4 including additional burners mounted in the roof of said enclosure adapted for providing additional hot gases within said enclosure and supplementary preheating of said charge on said conveyor.

* * * * *